United States Patent
Barker

(10) Patent No.: US 6,253,125 B1
(45) Date of Patent: Jun. 26, 2001

(54) METHOD AND APPARATUS FOR GENERATING ORBITAL DATA

(75) Inventor: Lee A. Barker, San Jose, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/516,927

(22) Filed: Mar. 1, 2000

(51) Int. Cl.$^7$ .................................................. B64G 1/24
(52) U.S. Cl. ........................ 701/13; 701/222; 701/300; 342/355; 244/158 R
(58) Field of Search .................... 701/13, 226, 213, 701/222, 300, 4; 244/164, 171, 158 R, 176; 342/355, 357.06, 357.08, 357.11, 357.02, 358

(56) References Cited

U.S. PATENT DOCUMENTS 5,259,577 * 11/1993 Achkar et al. .................... 44/164
5,984,238 * 11/1999 Surauer et al. .................... 244/171

FOREIGN PATENT DOCUMENTS

0123456-A2 * 1/2000 (EP) ...................................... 100/100

* cited by examiner

Primary Examiner—Tan Nguyen
(74) Attorney, Agent, or Firm—Perman & Green, LLP

(57) ABSTRACT

Satellite control data in the form of state vectors and state vector products are generated representing the position and geometric relationships of the space craft to the Earth, sun, moon, and specific locations on the Earth. These data is used to control attitude, SADA steering, antenna pointing, momentum upload, and Earth sensor intrusion. An onboard orbit propagator predicts the data and integrates the data into the various control systems for the respective function.

12 Claims, 8 Drawing Sheets

Table 1. Attitude Independent State Vector Products

| Low Rate (0.1 Hz) State Vector Product | Definition | Units |
|---|---|---|
| beta | angle between sun vector and orbit plane in radians | rad |
| angularRate | orbit angular rate | rad/s |
| angularAccel | orbit angular accelleration | rad/s^2 |
| alpha | angle between position vector and orbit noon | rad |
| alphaDot | angular rate between position vector and orbit noon | rad/s |
| alphaDotDot | angular acceleration between position vector and orbit noon | rad/s^2 |
| sunNorm | normalized unit vector from spacecraft to sun in ECI coordinates | |
| moonNorm | normalized unit vector from spacecraft to moon in ECI coordinates | |
| earthHalfAngle | Earth half angle | rad |
| sunHalfAngle | sun half angle | rad |
| moonHalfAngle | moon half angle | rad |
| earthRadiusScaleFactor | earthHalfAngle divided by earthHalfAngle at geosynchronous altitude | unitless |
| earthPolarHalfAngle | Earth polar half angle | rad |
| sunUpFlag | flag indicating sun above Earth horizon or eclipsed | 1 = visible 0 = eclipsed |
| moonUpFlag | flag indicating moon above Earth horizon or eclipsed | 1 = visible 0 = eclipsed |

Figure 5A

Table 1 (Cont.)

| moonIllumFract | fraction of moon illuminated by sun | 0.0-1.0 |
|---|---|---|
| H | angular momentum vector | km^2/sec^2 |
| TODtoECEF | transformation matrix | |
| ECEFpos | ECEF position vector | km |
| argLat | argument of latitude | rad |

Figure 5B

Table 2. Attitude Dependent State Vector Products

| High Rate Fundamental State Vector Product | Definition | Units |
|---|---|---|
| ECItoBodyFrame | transformation matrix | |
| sunBody | normalized unit vector from spacecraft to sun in body coordinates | |
| moonBody | normalized unit vector from spacecraft to moon in body coordinates | |
| sunRoll | sun roll angle in body frame | rad |
| sunPitch = sadaAngleCmd | sun pitch angle in body frame | rad |
| moonRoll | moon roll angle in body frame | rad |
| moonPitch | moon pitch angle in body frame | rad |
| sunElevation | Sun angle from body x-z plane | rad |
| sinSunPitch | Sine of sunPitch | |
| cosSunPitch | Cosine of sunPitch | |

Figure 6

METHOD AND APPARATUS FOR GENERATING ORBITAL DATA

BACKGROUND OF THE INVENTION

An orbiting satellite is in continuous need of data relating to its position in order to maintain or change its orientation with respect to earth and its orbital path. In addition the adjustment of antenna arrays, solar arrays, and other common functions is also dependent on this information. Much of these data is currently uploaded from ground stations either automatically or by manual intervention. This cannot be accomplished on a continuous basis because of gaps in communication as the satellite orbits the earth.

Attitude control is a primary example of a function which requires such information. Modern satellites now have an extensive means to accumulate information by means of onboard sensing of the positions of the earth, sun, stars, and other satellites. In addition an orbital calendar (ephemeris) may be stored in onboard computers which contain the expected orbital path and schedule of attitudes. A further database of expected repetitive perturbations can be stored and updated by actual experience. From this data an orbital model can be predicted and used to correct errors in attitude, orbital position and the focus of the various arrays.

Where a geosyncronous orbit is involved, the data is relatively stable, since the relative position of earth remains the same. The data becomes more dynamic as the orbit becomes more complex. With the advent of commercial satellites, there is a greater demand for complex orbits which provide greater "hang time" over specified areas of high demand. An example of such an orbit is a so called Tundra orbit which is an inclined elliptical sidereal day orbit. The relative position of the earth in such orbits is no longer constant and there is a continuous need to update data with respect to earth and other referenced bodies in the galaxy. It is anticipated that, when such orbits are used, the orbital and attitude data will need to be updated as frequently as every ten seconds, depending on the application served by the satellite.

There is a need, therefore, for a method of propagating the required information which is resident onboard. The information needs to be translated into a reference frame suitable for use by the various functions. It is a purpose of this invention to provide an onboard system for generating near real time knowledge of the spacecraft position and velocity to more efficiently perform station keeping and more accurately control attitude, solar arrays, and antenna pointing based on data sensed onboard by earth, sun and other sensors.

SUMMARY OF THE INVENTION

Satellite control data in the form of state vectors and state vector products are generated representing the position and geometric relationships of the space craft to the Earth, sun, moon, and specific locations on the Earth. These data is used to control attitude, SADA steering, antenna pointing, momentum management, and Earth sensor scan inhibit scheduling. An onboard orbit propagator predicts the data and integrates the data into the various control systems for the respective function. The state vector, consisting of position, velocity, and epoch, is generated in a geocentric equatorial coordinate frame at fixed ten second intervals. From this data, a series of vector products are generated to serve particular functions. The vector products are organized into two groups, attitude independent vector products and attitude dependent vector products. A subset of data representing the attitude profile is based on the attitude independent vector products and is integrated with the attitude dependent group. These outputs are used by the various function controls to provide the ideal solution for the closed loop function controls. Sensor processors provide the real time position attitude based on sensed references for comparison to the ideal solution generated by the orbit propagator of this system.

A validity check is performed each time the state vector is generated to insure continuing performance. The predicted state vector is tested by two methods. One involves the calculation of an angular momentum vector based on the state vector position and velocity predictions. This is compared to prior momentum vectors to detect abnormal variations. Since in high energy orbits, of the type to be used, the momentum vector will remain quite stable, relatively small variations will be suspect and generate an invalid determination. In addition, the current argument of latitude is calculated and compared to the prior argument of latitude to obtain a rate of change. The rate of change is then compared to the fastest angular rate in the orbit. A higher angular rate will also generate an invalid decision. Invalidity will result in the insertion of the last valid state vector into the orbit propagator to stabilize the propagation process. A valid decision will result in the state vector being buffered for use in generating the next level of vector products.

DESCRIPTION OF THE DRAWING

The invention is described in more detail below with reference to the attached drawing in which:

FIGS. 5A and 5B show a table of attitude independent vector products; and FIG. 6 shows a table of attitude dependent vector products.

DETAILED DESCRIPTION OF THE INVENTION

A satellite is equipped with a control computer which manages the functioning of the computer. The computer is constructed of a series of interconnected processors operated by programs resident on the computer. A group of these processors, referred to as the orbit propagator 1, cooperate to predict a state vector periodically according to the demands of the orbiting satellite. The state vector consists of a prediction of the desired position and velocity of the satellite at a particular time or epoch. For ease of description and understanding, the terms processor or module are used to describe discrete functional units. It should be understood that such functions may be equally executed by blocks of software or firmware operated on one or several computers or microprocessors.

Figure 1:
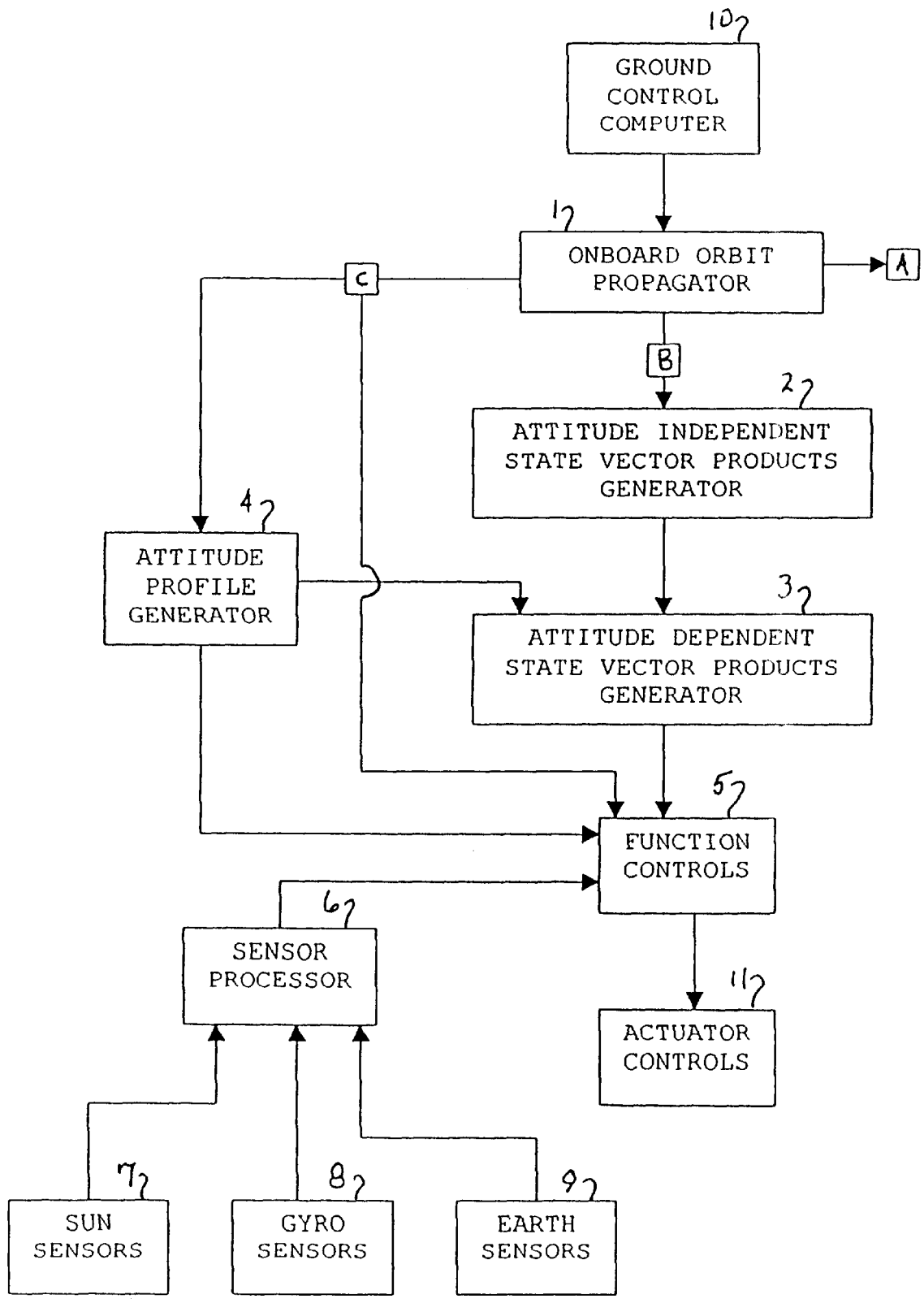
FIGS. 1 and 2 are block diagrams of the system of this invention.

As shown in FIG. 1, a ground control computer 1 is in communication with the satellite to upload the initial state vector and other data, including the timing of the propagation process, the satellite properties, and reference frame, to the orbit propagator 1. Driven by integrated modeling software, the orbit propagator 1 generates a predicted state vector and provides it to an attitude independent processor 2 and an attitude dependent processor 3. Each of the processors 2 and 3 generate a series of second level vector products based on the state vector and other inputs. The second level vector products are designed to drive the closed loop controls for specific satellite functions such as attitude control, solar panel array adjustment, earth sensor scan inhibit timing, momentum management, and antenna pointing. An attitude profile generator 4 provides further predicted data, relating to attitude, based on the output of the attitude independent processor 2. The attitude dependent processor 3 generates a set of vector products based on inputs from the attitude independent processor 2 and the attitude profile generator 4. A profile of the two groups of vector products are illustrated in the tables of FIGS. 5A, 5B, and 6. Other vector products may also be useful depending on the desired function being controlled.

The function controller 5 consists of series of modules which calculate a predicted value for each of the functional adjustments from the second level vector products. The control modules receive sensed data necessary for generating an error signal relative to the controlled function. The sensed data is compared to the predicted data to obtain the error signal and drive the actuator controls.

A sensor processor 6 receives data from the a series of sensing devices, which may include an array of sun sensors, a gyroscope assembly, star trackers, an earth scanner and other devices for monitoring reference data. The sensor processor compiles the sensed data and converts it to a reference frame compatible with the predicted data. To avoid inaccuracies in earth scanning, the scanner is inhibited during periods of intrusion by the sun and moon.

Figure 2:
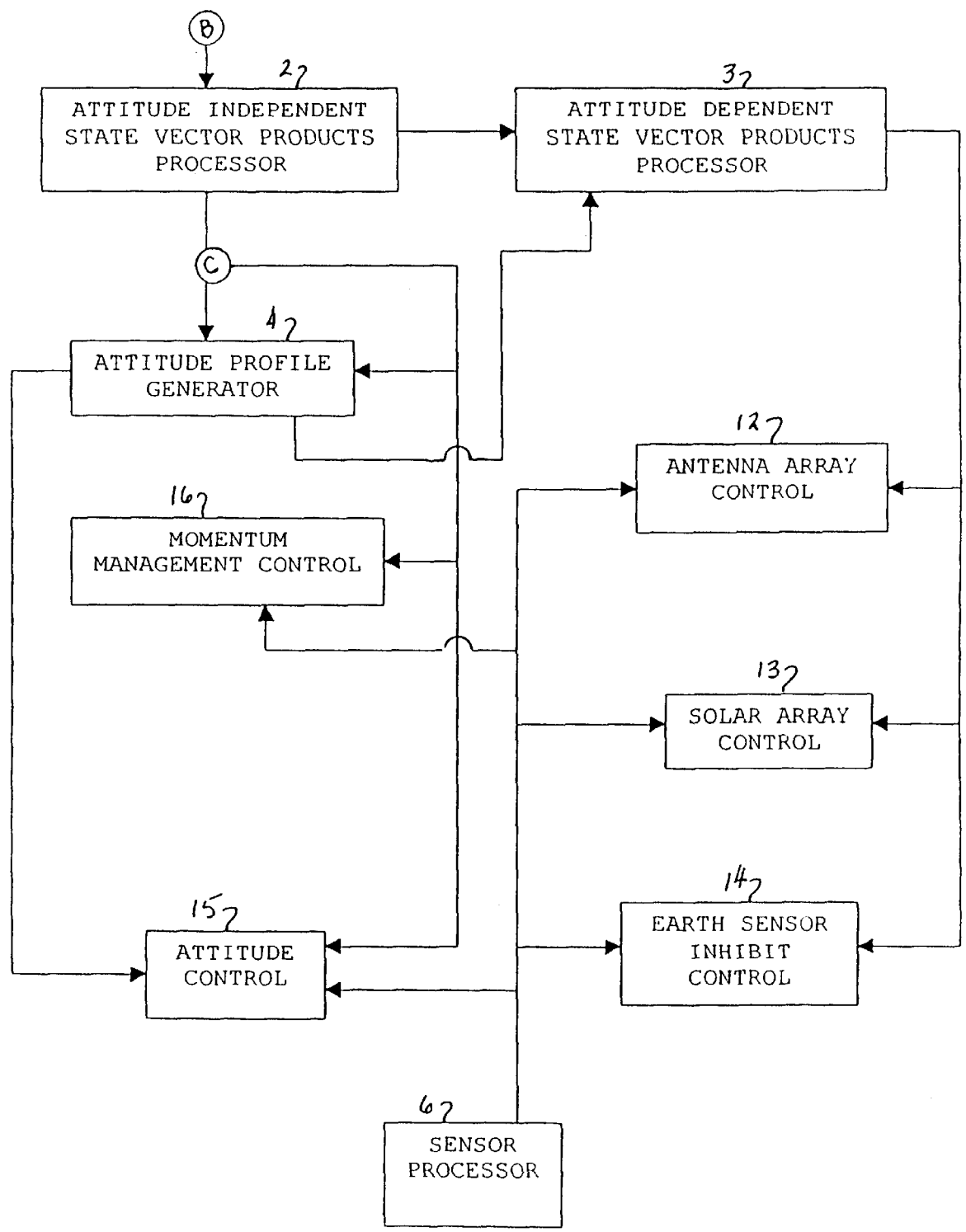

As shown in FIG. 2, the functional controllers 5 receive the attitude independent vector products. Attitude control 15 calculates desired attitude parameters based on the vector products from processor 2 and the attitude profile generator 4 and compares it to sensed attitudes from the sensor processor 6 to fire thrusters or other attitude adjusting actuators. Processor 2 also provides the vector products required to provide momentum management.

Attitude dependent vector products are provided to solar array controller 13, earth scan inhibiter 14 and antenna array control 12, as shown in FIG. 2.

This division of processing signals is based on several factors one of which is to match the processing rates of the various processors and modules into compatible groups and of course another is to separate the vector products which are independent of attitude from those that are dependent. As shown, the processing rate of the dependent attitude processor 3 is matched to the profile generator 4.

Figure 4:
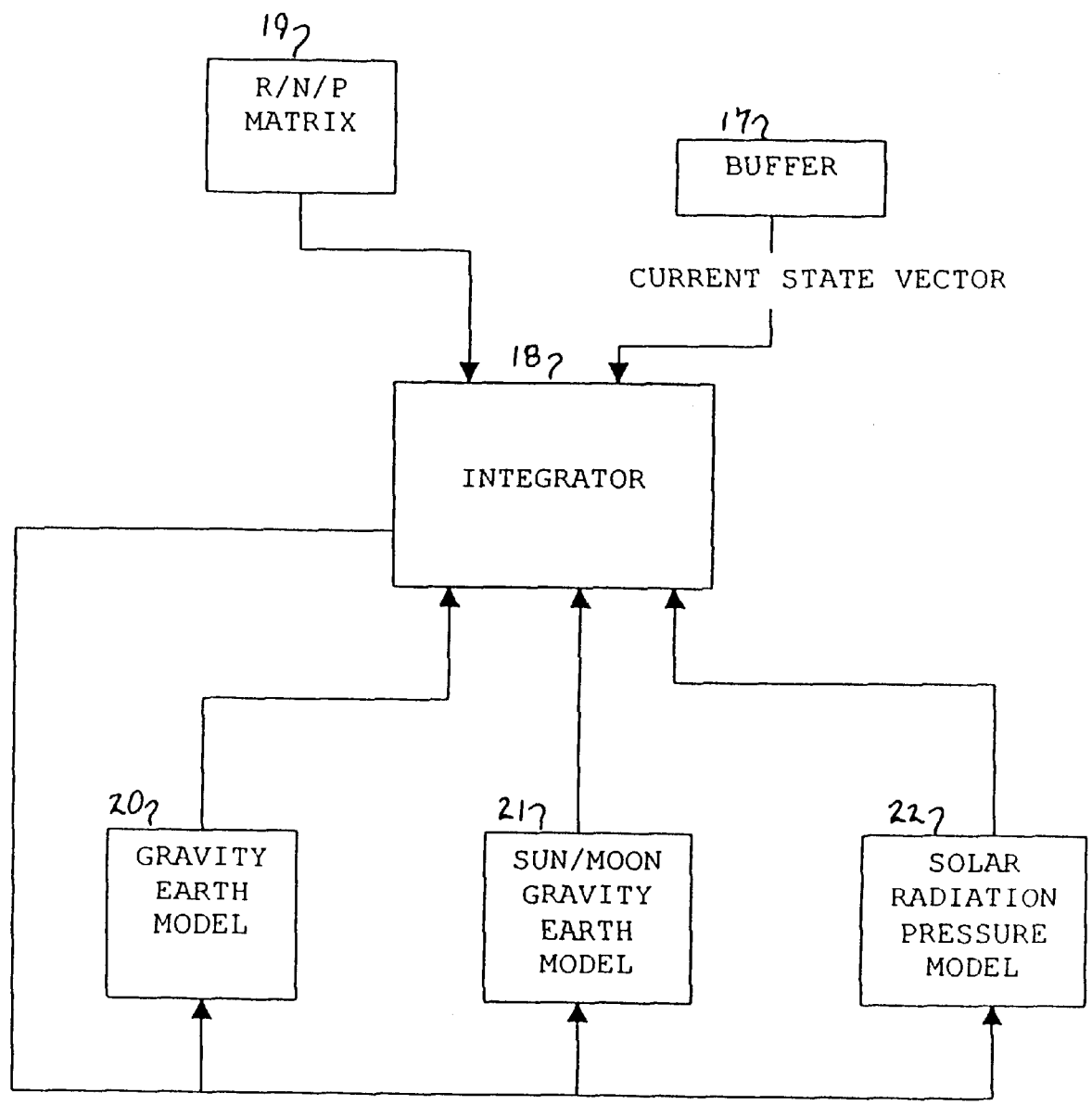
FIG. 4 is a block diagram of the orbit propagator use in this invention.

The basic components of orbit propagator 1 are shown in FIG. 4. Orbit propagator 1 operates in an open loop manner based on an initial condition state vector derived from orbit determination and uploaded from ground control computer 10. The main processing of the initial state vector may be accomplished with a Runge Kutta integrator 18, which is set up for a ten second propagation step. The various forces, to which the satellite is subjected over an orbit, are predicted in gravity earth model processor 20, sun/moon gravity model 21, and solar radiation pressure model 22 and factored into the propagation step of the integrator 18. The earth's gravity force may be calculated using a gravity model such as Goddard Earth Model 9, described in *Gravity Model Improvement Using Geos* 3 (*GEM* 9 *and* 10), Lerch et al, Journal Geophysical Research, Vol. 84, No. B8, July 1979. Naval Observatory Astronomical Almanac formulas may be used to predict sun/moon position vectors for a specific epoch, as described in *The Astronomical Almanac for the Year* 1997, Nautical Almanac Office, U.S. Naval Observatory, U.S. Government Printing Office, 1996. From these position vectors the gravity effect on an Earth orbiting satellite may be predicted, see *Fundamentals of Astrodynamics*, Bate et al, Dover Publications, New York, 1971. Solar radiation pressure may be predicted based on formulas described in *Introduction to Geostationary Orbits*, E. Mattias Soop, European Space Operations Center, European Space Agency, 1983.

In order to integrate the various inputs the integrator 18 must operate in a variety of reference frames both inertial and rotating with the earth. To accomplish this, a rotation, nutation, precession matrix is set up in matrix processor 19 and used to translate to enable the use of the inertial frame during propagation of the current state vector. The current state vector is in a true of date, inertial reference frame.

Figure 3A:
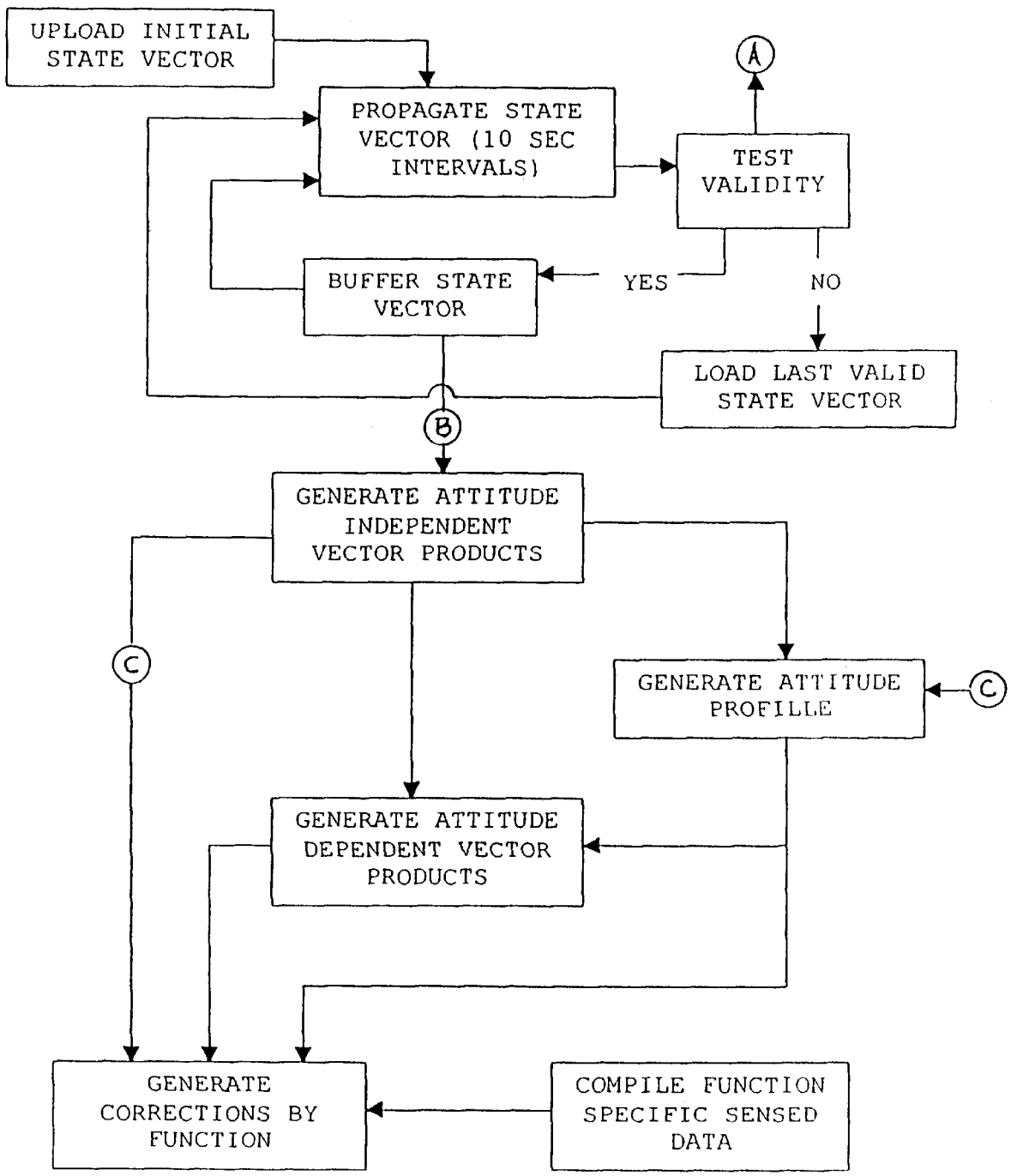
FIGS. 3*a* and 3*b* are charts of the method of this invention.
Figure 3B:
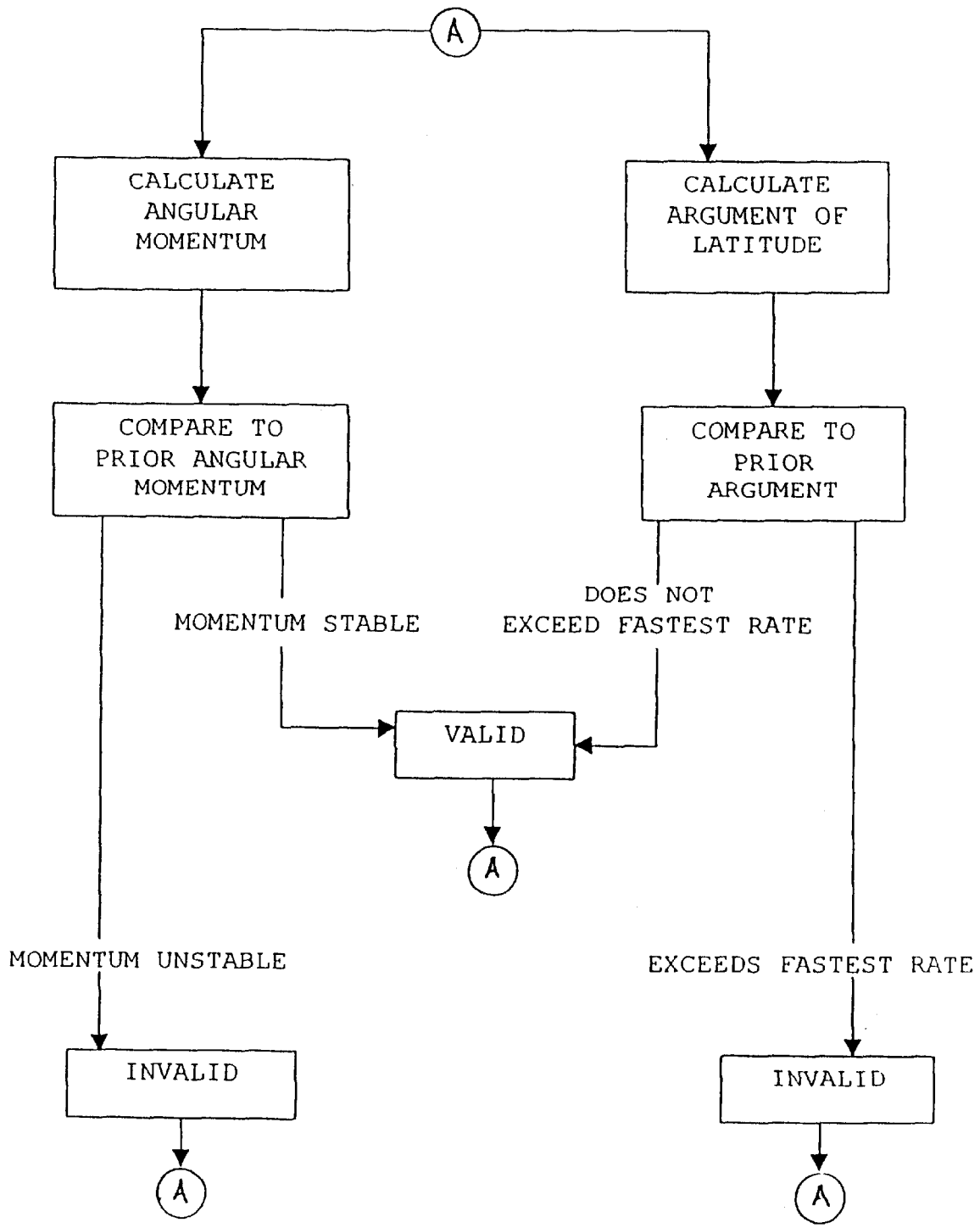

In operation the current state vector is predicted in the orbit propagator 1 and tested for validity as shown in FIG. 3A. The validity test cycle is shown in FIG. 3B. A valid current state vector, is stored in a buffer 17 for call up by the various processors. Based on the current state vector, two groups of second level vector products are prepared and converted for use in the control loops of the specific functions identified above. For processing compatibility, the two groups are chosen as attitude dependent and attitude independent. The attitude independent vector products are based directly on the current state vector, while the attitude dependent vector products are based on the independent vector products and a predicted attitude profile. The relevant sensed data is compared to the predicted function data in function control processors 5 to generate actuation instructions for the various adjustment mechanisms.

The validity test is devised as a simple method to quickly reject the current state vector where inaccuracies occur, due to data corrupted during uploading from ground control or during the orbit propagation process. As a primary test of validity, the angular momentum is calculated in the validity test processor from the current state vector position and velocity vectors. Since this value is expected to be stable during the high energy orbits for which this invention is designed, an indication of instability will also result in a rejection of the current state vector. Another supplemental test is conducted which requires the calculation of the argument of latitude based on the current state vector. Since the rate of change of this value is repetitive, it is compared to the fastest angular rate of change of the orbit. If the rate is exceeded the current state vector is deemed invalid and this is reported back to initiate a safety mode. In each instance of invalidity, a simple, single path to system recovery is needed. To provide this, the last valid current state vector is presented to the orbit propagator and the propagation proceeds on this basis.

A control system is thereby provided that significantly improves the autonomy of a satellite even where complex orbits require frequent periodic updating of orbit information. The information flow is streamlined thereby allowing an current state vector to be propagated in intervals as frequently as 10 seconds. The current state vector is readily validated to avoid the problems of corrupted data.

I claim as my invention:

1. In a control system for a satellite including an orbit propagator constructed to predict a current state vector including position, velocity and epoch for use in the functional control of the satellite, a series of computer modules for processing said current state vector comprising:

a first processor connected to receive said current state vector and generate a first set of vector products independent of attitude;

an attitude profile generator connected to receive the first set of vector products and generate an attitude profile based thereon;

a second processor connected to receive said first set of vector products and said attitude profile, and, based on said received data, said second processor generating a second set of vector products dependent on attitude;

a sensor processor connected to receive reference data sensed by sensor arrays mounted on the satellite; and a closed loop function control processor constructed of control modules operated by software designed to provide error correction data to multiple actuators relating to specified functions of the satellite, each of said control modules connected to receive selected vector products of said first and second set, said selected vector products being related to the assigned function of the module, each of said control modules also connected to receive corresponding sensed data, and each module comparing the predicted values of said vector products with said sensed data to calculate a correction.

2. In a control system for a satellite including an orbit propagator constructed to predict a current state vector including position, velocity and epoch for use in the functional control of the satellite, a series of computer modules for processing said current state vector, as described in claim 1, wherein said sensor processor receives sensed data from at least one of an array of sun sensors, gyroscopic sensors, star trackers, and/or earth sensors.

3. In a control system for a satellite including an orbit propagator constructed to predict a current state vector including position, velocity and epoch for use in the functional control of the satellite, a series of computer modules for processing said current state vector, as described in claim 1, wherein said function control processor comprises a set of modules designed to generate correction data for controlling at least one of the following functions: attitude control, momentum management, antenna array control, solar array control, and/or earth scan inhibit scheduling.

4. In a control system for a satellite including an orbit propagator constructed to predict a current state vector including position, velocity and epoch for use in the functional control of the satellite, a series of computer modules for processing said current state vector, as described in claim 1, further comprises a validity check system comprising:

a first processor operated by first software to receive said current state vector and calculate, based thereon, current angular momentum, said first processor further comparing said current momentum to a prior calculated momentum to determine if said current momentum indicates stability of momentum;

a second processor operated by second software to receive said current state vector and calculate a current argument of latitude based thereon, said second processor further comparing said current argument of latitude to a prior argument of latitude to determine a rate of change, and further comparing said rate of change to the fastest angular rate of said orbit to determine if said rate of change exceeds said fastest rate; and wherein said processors generate a signal indicative of invalidity when the current angular momentum indicates instability or when the rate of change of the argument of latitude exceeds the fastest rate of the orbit, and further wherein the orbit propagator is provided with the last valid state vector in response to a signal of invalidity.

5. In a control system for a satellite including an orbit propagator constructed to predict a current state vector including position, velocity and epoch for use in the functional control of the satellite, a series of computer modules for processing said current state vector, as described in claim 1, further comprises a rotation/nutation/precession matrix generator to provide data to the orbit propagator for translating data amongst multiple reference frames and permit prediction of said current state vector in an inertial reference frame.

6. In a control system for a satellite, including an orbit propagator constructed to predict a current state vector, including position, velocity and epoch, for use in the functional control of the satellite, a method of processing said current state vector comprising the steps of:

receiving said current state vector and, based thereon, generating a first set of vector products independent of attitude;

based on said first set of vector products, generating an attitude profile;

based on said first set of vector products and said attitude profile, generating a second set of vector products dependent on attitude;

processing reference data sensed by sensor arrays mounted on the satellite; and based on selected vector products of said first and second set which relate to an assigned function of the satellite, and a comparison with said processed sensed data, calculating a correction for said assigned function.

7. In a control system for a satellite, including an orbit propagator constructed to predict a current state vector, including position, velocity and epoch, for use in the functional control of the satellite, a method of processing said current state vector, as described in claim 6, wherein said processed reference data includes: data from at least one of the following: an array of sun sensors, gyroscopic sensors, star trackers, and/or earth sensors.

8. In a control system for a satellite, including an orbit propagator constructed to predict a current state vector, including position, velocity and epoch, for use in the functional control of the satellite, a method of processing said current state vector, as described in claim 6, wherein said assigned functions include at least one of the following functions: attitude control, momentum management, antenna array control, solar array control, and/or earth scan inhibit scheduling.

9. In a control system for a satellite, including an orbit propagator constructed to predict a current state vector, including position, velocity and epoch, for use in the functional control of the satellite, a method of processing said current state vector, as described in claim 6, further comprising the steps of:

receiving said current state vector;

calculating, based on said current state vector, an angular momentum vector;

calculating, based on s aid current state vector, an argument of latitude;

comparing said angular momentum vector with a prior calculated momentum vector to determine if said momentum is stable;

comparing said argument of latitude with the prior calculated argument to determine if the fastest angular rate for said orbit is exceeded;

signaling the system control that an invalid current state vector has been propagated, when either the angular momentum is determined to be unstable or the fastest angular rate of the orbit is exceeded;

inputing to the orbit propagator a prior valid current state vector in response to an invalid signal; and storing the current state vector for use when said validity is determined.

10. In a control system for a satellite, including an orbit propagator constructed to predict a current state vector, including position, velocity and epoch, for use in the functional control of the satellite, a method of processing said current state vector, as described in claim 6, further comprising the step of generating a rotation/nutation/precession matrix to provide data to the orbit propagator for translating data amongst multiple reference frames and permit prediction of said current state vector in an inertial reference frame.

11. In a control system for a satellite including an orbit propagator constructed to repetitively predict an current state vector, including position, velocity and epoch for use in the functional control of the satellite in an orbit, a method of validating said current state vector comprising the steps of:

receiving said current state vector;

calculating, based on said current state vector, an angular momentum vector;

calculating, based on said current state vector, an argument of latitude;

comparing said angular momentum vector with a prior calculated momentum vector to determine if said momentum is stable;

comparing said argument of latitude with the prior calculated argument to determine if the fastest angular rate for said orbit is exceeded;

signaling the system control that an invalid current state vector has been propagated, when either the angular momentum is determined to be unstable or the fastest angular rate of the orbit is exceeded;

inputing to the orbit propagator a prior valid current state vector in response to an invalid signal; and storing the current state vector for use when said validity is determined.

12. In a control system for a satellite including an orbit propagator constructed to predict a current state vector including position, velocity and epoch for use in the functional control of the satellite, a validity check system comprising:

a first processor operated by first software to receive said current state vector and calculate, based thereon, current angular momentum, said first processor further comparing said current momentum to a prior calculated momentum to determine if said current momentum indicates stability of momentum;

a second processor operated by second software to receive said current state vector and calculate a current argument of latitude based thereon, said second processor further comparing said current argument of latitude to a prior argument of latitude to determine a rate of change, and further comparing said rate of change to the fastest angular rate of said orbit to determine if said rate of change exceeds said fastest rate; and wherein said processors generate a signal indicative of invalidity when the current angular momentum indicates instability or when the rate of change of the argument of latitude exceeds the fastest rate of the orbit, and further wherein the orbit propagator is provided with the last valid state vector in response to a signal of invalidity.

* * * * *

UNITED STATES PATENT AND TRADEMARK OFFICE
CERTIFICATE OF CORRECTION

PATENT NO.    : 6,253,125 B1  
DATED         : June 26, 2001  
INVENTOR(S)   : Lee A. Barker It is certified that error appears in the above-identified patent and that said Letters Patent is hereby corrected as shown below:

<u>Column 6, claim 9,</u>  
Line 56, "s aid" should read -- said --.

Signed and Sealed this

Twenty-sixth Day of March, 2002

Attest:

Attesting Officer

JAMES E. ROGAN  
*Director of the United States Patent and Trademark Office*